Jan. 15, 1924.
F. W. JOHNSON
1,480,909
PRESSURE REGULATING DEVICE
Filed Aug. 28, 1922
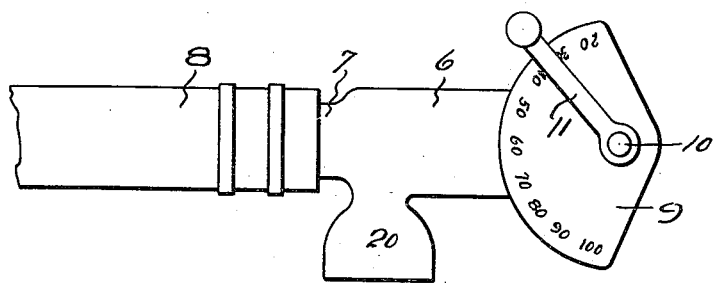
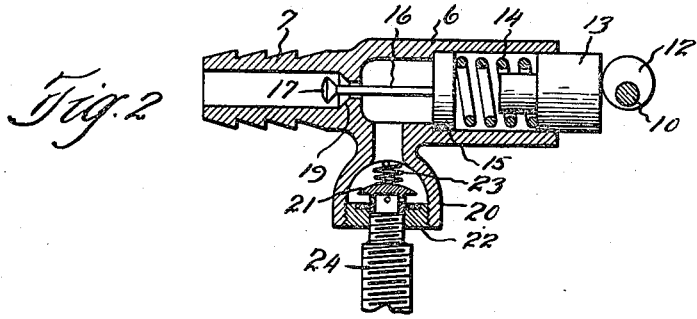
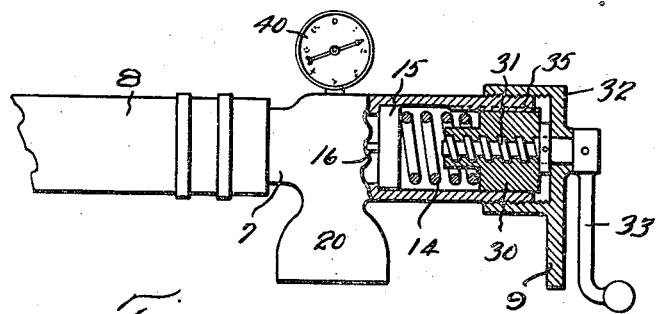
Inventor
Frank W. Johnson
By John A. Bonnhardt
Atty.

Patented Jan. 15, 1924.

1,480,909

UNITED STATES PATENT OFFICE.

FRANK W. JOHNSON, OF REDLANDS, CALIFORNIA.

PRESSURE-REGULATING DEVICE.

Application filed August 28, 1922. Serial No. 584,607.

*To all whom it may concern:*

Be it known that I, FRANK W. JOHNSON, a citizen of the United States, residing at Redlands, in the county of San Bernardino and State of California, have invented certain new and useful Improvements in Pressure-Regulating Devices, of which the following is a specification.

This invention relates to pressure regulating devices especially designed for use in connection with the inflation of tires and the like, the construction being such that after a certain pressure is forced into the tire the supply of air is cut off automatically thereby preventing any further increase of pressure in the tire. The device will operate to prevent blowing out tires in consequence of excess pressure received from air lines or the like. The device is capable of being set to stop the supply at various pressures.

The invention will be more fully understood from the following description and the accompanying drawings, in which Fig. 1 is a side elevation of one form of the device. Fig. 2 is a longitudinal section thereof. Fig. 3 is a section of a modification.

In the form shown in Fig. 1, 6 indicates a casing or small cylinder which has a nipple 7 at one end to which is connected the air pressure line 8. At the other end the casing supports or is provided with a graduated dial plate 9, which has figures around the edge indicating different pressures. At the center the dial plate has a bearing for the shaft 10 one end of which is provided with a handle 11 by which it may be turned, said handle also cooperating with the scale to form an index. At its opposite end the shaft 10 carries an eccentric 12 fixed thereto, and this eccentric bears against a plug 13 which slides in the open end of the cylinder 6 and is normally pressed against the eccentric 12 by a spring 14 coiled within the cylinder between the plug and a piston 15 which fits closely within the cylinder or casing. This piston carries a stem 16 at the end of which is a valve head 17 which opens inwardly, or toward the pressure line 8, and which closes against a seat 19 formed at the end of the passage in the nipple.

Between its ends the cylinder is provided with a branch or socket fitting 20 having therein a check valve 21 held by a screw ring 22, the check valve being pressed from behind by a spring 23. Normally the check valve will close against the ring 22, but when the socket is applied to the valve stem 24 the reduced end of the stem will lift the check valve from its seat as usual and so open the passage. The ring 22 may be provided with an ordinary rubber gasket to insure a tight joint.

In the use of the device, the handle 11 is turned to the desired pressure and this action forces the plug 13 inwardly, compressing the spring 14 and forcing the piston inwardly to open the valve 17. When the device is applied to the valve stem 24 the check valve 21 will be opened. By this means a clear passage is made from the supply pipe 8 into the tire. As the pressure increases, the piston 15 will be forced outwardly to a corresponding extent, the spring 14 being compressed, and when the desired pressure is reached the valve 17 will close against its seat 19 thereby cutting off the supply of air and preventing further inflation of the tire.

In the modified form shown in Fig. 3, instead of using an eccentric to compress the spring, a non-rotating nut 30 is mounted on a screw 31 which extends outwardly through a cap 32 screwed on the cylinder 6, and the screw has a handle 33 which cooperates with the dial and serves to turn the screw. The nut bears against the spring 14 and as the screw is turned the nut may be advanced or retracted according to the pressure desired. Rotation of the nut in the cylinder may be prevented by any suitable means, such as a spline and groove indicated at 35. The operation of this form is the same as that above described. By setting the screw to the desired pressure the valve 17 will close when the pressure becomes sufficient to shift the piston 15 against the tension of the spring as adjusted. A gage 40 may be tapped into the cylinder if desired to indicate the existing pressure within the same. Various modifications may of course be made in the form of the socket connections for applying the device to the valve stem, and the invention is not limited to any particular form of such a connection. Likewise the construction and arrangement of the various other parts may be modified. It will be noted that when the pressure reaches the amount to which the instrument is set the passage from the supply line to the tire is completely closed off and additional pressure merely seals the passage the tighter.

I claim:

A pressure regulating device comprising a casing having an inlet adapted for connection to a source of pressure supply, and an outlet, a valve in the casing controlling the passage from the inlet to the outlet, a piston connected to said valve and movable in the casing and subject to the pressure therein, a spring resisting movement of the piston incident to the pressure, and means to adjust the resistance of the spring, said means including a dial plate supported on the end of the casing and having thereon a scale indicating pressure, a plug slidable in the casing and acting on the spring and a rotary operating device extending through the dial plate and bearing against the plug and having an external lever handle cooperating with the scale to indicate the pressure at which the device is set.

In testimony whereof, I affix my signature in presence of two witnesses.

FRANK W. JOHNSON.

Witnesses:
 MAY JOHNSON,
 WILLIAM STANTON.